(12) United States Patent
Biggel et al.

(10) Patent No.: US 8,783,142 B2
(45) Date of Patent: Jul. 22, 2014

(54) CUTTING PIECES OUT OF A MASS OF CHEESE

(75) Inventors: Andreas Biggel, Hergatz (DE); Roland Zeuschner, Argenbühl (DE)

(73) Assignee: Hochland SE, Heimenkirch (DE)

( * ) Notice: Subject to any disclaimer, the term of this patent is extended or adjusted under 35 U.S.C. 154(b) by 260 days.

(21) Appl. No.: 13/130,491

(22) PCT Filed: Dec. 11, 2009

(86) PCT No.: PCT/EP2009/066991
§ 371 (c)(1),
(2), (4) Date: May 20, 2011

(87) PCT Pub. No.: WO2010/066897
PCT Pub. Date: Jun. 17, 2010

(65) Prior Publication Data
US 2011/0226102 A1    Sep. 22, 2011

(30) Foreign Application Priority Data
Dec. 11, 2008   (DE) .......................... 10 2008 061 330

(51) Int. Cl.
*A01J 27/04* (2006.01)
*B26D 1/56* (2006.01)

(52) U.S. Cl.
USPC .................................... 83/39; 83/408; 83/932

(58) Field of Classification Search
USPC ........... 83/408, 932, 321, 324, 327, 602, 284, 83/298, 302, 311, 315, 111, 112, 23, 39, 83/43, 44, 45, 47
See application file for complete search history.

(56) References Cited

U.S. PATENT DOCUMENTS

| | | | |
|---|---|---|---|
| 2,241,427 A * | 5/1941 | Shields ........................... | 474/31 |
| 2,802,431 A * | 8/1957 | Hoagland et al. ............... | 83/311 |
| 3,887,719 A | 6/1975 | Miller | |
| 4,193,272 A | 3/1980 | Bernard | |
| 4,195,489 A | 4/1980 | Bernard | |
| 4,488,464 A * | 12/1984 | Rooke et al. ...................... | 83/99 |
| 4,679,473 A * | 7/1987 | Hirata et al. .................... | 83/157 |
| 5,129,299 A * | 7/1992 | Fischer et al. ............... | 83/356.3 |
| 5,601,855 A | 2/1997 | Fager et al. | |
| 6,070,509 A | 6/2000 | Lonn et al. | |
| 6,237,456 B1 | 5/2001 | Baur et al. | |
| 7,100,486 B2 | 9/2006 | Akins et al. | |
| 2005/0005745 A1* | 1/2005 | Akins et al. ...................... | 83/13 |
| 2009/0165626 A1* | 7/2009 | Sundquist et al. .......... | 83/699.41 |
| 2010/0275751 A1 | 11/2010 | Zeuschner | |

FOREIGN PATENT DOCUMENTS

| | | |
|---|---|---|
| DE | 19504152 | 8/1996 |
| DE | 19807497 | 8/1999 |
| EP | 0614733 | 9/1994 |
| WO | 9316851 | 9/1993 |

* cited by examiner

*Primary Examiner* — Stephen Choi
(74) *Attorney, Agent, or Firm* — Robert Lelkes; Stolmar & Partner

(57) ABSTRACT

Disclosed is a method for cutting pieces having a predefined length, i.e. sticks, out of a mass of cheese, in which a cheese bar is first cut into parallel longitudinal strips while being conveyed on a belt conveyer using a longitudinal cutting device. The longitudinal strips are then cut into pieces using a transverse cutting device having a transverse cutting knife, which is conveyed along with the cheese bar during the transverse cutting process.

11 Claims, 2 Drawing Sheets

CUTTING PIECES OUT OF A MASS OF CHEESE

The invention relates to a method for the cutting of pieces of predetermined length ("sticks") from a cheese mass, the cheese mass being shaped in a continuous process to a wide cheese bar of predetermined thickness, the cheese bar being fed to a cutting apparatus by means of a conveyor belt with conveying speed, and the cheese bar being cut with means for longitudinal cutting initially in longitudinal strips lying parallel next to one another. The invention additionally relates to a device for implementing the method.

Generally, the longitudinal cutting of such wide bars of melted cheese is known from a series of documents. Mention may be made by way of example of DE-OL 2 161 211, which discloses the longitudinal cutting of a wide bar of melted cheese by means of round disc blades, which are arranged at a predetermined spacing on an axis, a corresponding number of narrow longitudinal strips being present following the longitudinal cutting. As is known for example from U.S. Pat. No. 5,601,855, following the longitudinal cutting, the longitudinal strips cut in this manner are cut up in the transverse direction to form cheese chippings or small cheese cubes by means of a roller equipped with cutters.

In the known devices, the thin layer of the pasty melted cheese or of the soft mozzarella cheese, respectively, has a strong tendency to stick to the cutting rollers on account of the tacky consistency. In order to avoid for example that the cut food bars do not wind up with the cutting rollers, corresponding stripping means are required, which engage with fingers between the cutting discs and convey the tacky product out of the cutting roller. On account of the considerable touch contact, considerable contaminants arise on the individual elements, so that the same have to be replaced and cleaned often.

In the case of the known generic devices, it is therefore also less of a controlled cutting process for producing individual pieces of individual size than a type of chopping comminution of the cheese bar, in which the size of the resulting chippings can only be set to a certain extent. Such cheese cut into crumbs is particularly filled into bags and is used by the end consumer for sprinkling onto meals to be prepared au gratin, such as pizza for example. In this case, the thickness of the cheese bar to be processed in this manner has hitherto been a strongly limiting factor, the thickness of the cheese bar being only a few millimeters. It has hitherto not been possible to process larger thicknesses, particularly with the known kind of transverse cutting, as a greater adhesion of the product on the transverse cutting blades results.

It is now the object of the present invention to create a method, which is technically simple to implement, and a compact device, which enables the controlled cutting of a cheese bar into individual pieces, method and device offering the possibility, with greater ease of maintenance and high service life, of cutting pieces with settable dimensions and feeding them to further processing.

These objects are achieved by the method with the characterising features of claim 1 and the device according to claim 8. Particular embodiments are mentioned in the respective sub-claims.

The invention is initially based on the approach of disregarding the supposed difficulties during cutting, which result from the soft and tacky consistency of the cheese (also referred to as "product" in the following), and processing the cheese in a manner which appears per se to be suitable for harder or more rigid products with greater cut resistance. This approach leads to the particular basic idea of the invention, namely of carrying out the transverse cutting of the strips cut out of the cheese bar in a stamping movement on the conveyor belt, which can be set in terms of its components, the stamping transverse cutting knife being entrained with the cheese bar at the conveying speed during the cutting or stamping procedure, so that a continuous vertical cut through the product results.

According to the invention, the method is implemented in that the longitudinal strips lying parallel next to one another on the conveyor belt and completely cut are cut into pieces of settable size by means of the transverse cutting means, the transverse cutting means having a transverse cutting knife which bridges the cheese bar at least to some extent and is entrained at the conveying speed during cutting and can be set in terms of its movement. An important aspect is additionally that the cheese pieces created following the longitudinal cutting and the transverse cutting initially remain on the conveyor belt (in an ordered layer) and are conveyed by the conveyor belt out of the cutting apparatus. In this case, comprehensive experiments have shown that this type of "atypical" cutting for cheese leads to a flawless end product, namely to exactly cut pieces of defined size.

The entraining movement is effected in that one component is controlled along the conveying direction ("x axis") and the other component, vertical thereto, is controlled in the direction of the conveyor belt ("z axis") and the components are controlled independently of one another. By means of this controlling, it is on the one hand possible to prepare cheese pieces of any desired size. The controlling even offers the possibility of separating the individual cheese pieces from one another by means of a displacement in the conveying direction along the belt.

The special feature of the procedure according to the invention therefore lies in the fact that a format-precise cutting of "sticks" from industrially produced cheese, particularly from melted cheese or mozzarella, is possible. These sticks which form the end product can be packed individually or in multiples in a following processing step. A particular advantage of the device according to the invention is that it can be inserted as a unit into any continuous production sequence without any problems and in a space saving manner. In this case, the continuous shaping of the cheese bar in a shaping device is at the start of the production sequence. This shaping device can have rollers or steel bands which roll the heated fluid product to form the cheese bar and cool the same down to less than room temperature, for example to a temperature between 6° C. and 10° C. Temperatures of this order of magnitude have proven particularly advantageous.

In order to enable the flexible integration into a production sequence, the device according to the invention has corresponding transfer means at its upstream inlet and at the downstream outlet. In an advantageous embodiment, a sharp belt diversion at the outlet ensures a product-friendly and orderly transfer of the product to further processing. As mentioned, a particular advantage lies in the fact that the device according to the invention is of compact construction and ensures good mobility. In this case, in spite of a short overall length, particularly preferred embodiments can process a product bar with a bar width of more than one meter and a thickness of a few centimeters.

A further advantage of the invention is the fact that it fulfils the high demands on hygiene which exist especially for the processing of cheese, as the device can be cleaned particularly well on account of its modular construction for its part. In addition, the components acting on the product barely offer the product the possibility of adhesion on account of the expedient and simple design. In addition, a conveyor belt which can be detensioned and replaced quickly is a guarantee for convenient and thorough cleaning. Overall, the invention offers not only optimisation of the functionality, but also a reduction of the costs, a lengthening of the lifetime with little wear and an improvement of the hygiene and the safety.

As illustrated, the special feature of the invention lies in the fact that firstly, individual pieces can be cut in any desired shape and dimension from industrially produced cheese. In particular, bar-shaped sticks of well over a centimeter height and width can be cut with any desired length. The stamping transverse cutting according to the invention in particular makes it possible to cut a product bar of more than one centimeter thickness. Particularly in the case of the particularly advantageous embodiment which has a bilateral guide and a bilateral drive of the support of the transverse cutting knife, barely any limits are placed on the width of the product bar to be cut.

In a particularly advantageous embodiment, the length of the transverse cutting knife is dimensioned in such a manner that it only cuts the desired sticks, but not the edge strip(s) remaining on the cheese bar. These are then retained as such and are advantageously removed from the conveyor belt via an outlet path and conveyed away from the device for separate further processing, particularly for reuse. In this manner, greater effectiveness can be achieved during the production.

In order to be able to set the cuts of the transverse cutting knife in any desired manner and precisely, it is particularly advantageous if the movement of the transverse cutting knife during transverse cutting is broken down into one component along the conveying direction ("x axis") and into one component vertical thereto in the cutting direction ("z axis") and if both movement components are controlled independently of one another. With a control of this type, the length of the cheese pieces can be set exactly by means of the controlling of the movements in relation to the conveying speed. The cut can also be adjusted optimally to the product and to the conveyor belt by the control.

In addition, a relative movement with respect to the conveyor belt can, as described, be generated, so that the cut pieces can be shifted a little forwards from the cheese bar, which facilitates the later separation. It is also possible to displace the cut a little forwards or backwards with respect to the backpressure roller arranged below the transverse cutting knife, as a result of which the cut quality can be improved. This possibility is principally also opened up by the flexible conveyor belt, which can yield accordingly during the cut.

A very important further aspect is the fact that the transverse cutting knife has a flexibility which enables a bending in the z direction. Thus, the geometry of the transverse cutting knife can be optimised to cutting against the conveyor belt. The setting of such a bending in the z direction in this case takes place via setting means, such as screws, which are distributed at a certain spacing over the length of the transverse cutting knife in particular.

In order to prevent a lifting off of the product from the conveyor belt during the transverse cutting, it is advantageous if the longitudinal strips and the cheese pieces created from the cut are acted upon during transverse cutting by means of a hold-down device arranged a short distance from the surface of the cut cheese bar or lying on the surface and entrained with the conveying speed along the x axis. This secures the product during the transverse cutting until the transverse cutting knife has pulled back out of the cheese mass. The hold-down device has a height setting, so that it can be adjusted onto the product surface. The height setting can advantageously be set manually from outside during operation.

During longitudinal cutting, the product, particularly the melted cheese or the mozzarella, is advantageously cut into longitudinal strips with fast running cutting blades which are provided with one or a plurality of teeth. In this case, the tooth height is greater than the thickness of the cheese bar and the rotational speed of the cutting blades is set in such a manner in relation to the conveying speed that the tooth tip of a tooth descends into the food bar when cutting and brings about a slit of certain slit length in the cheese bar moving in the same direction. As with saws, the slit brought about by the following tooth adjoins the previous slit. Such cutting blades offer little contact surface and slit the cheese bar more or less "only" with the tooth tips. The toothed cutting blades have the substantial advantage that, during the cut, the contact with the product is intermittently interrupted, so that the friction between the cutting blades and the product is strongly reduced. In addition, in the case of the cutting blades arranged in parallel with small spacing, the effective binding area for the product is limited to a minimum.

Advantageously, the longitudinal cutting means can be pivoted out upwardly, so that the cleaning and the format change is facilitated and additionally a secure and ergonomic operation is ensured.

The invention is explained further below on the basis of FIGS. 1 and 2. In the figures.

Figure 1:
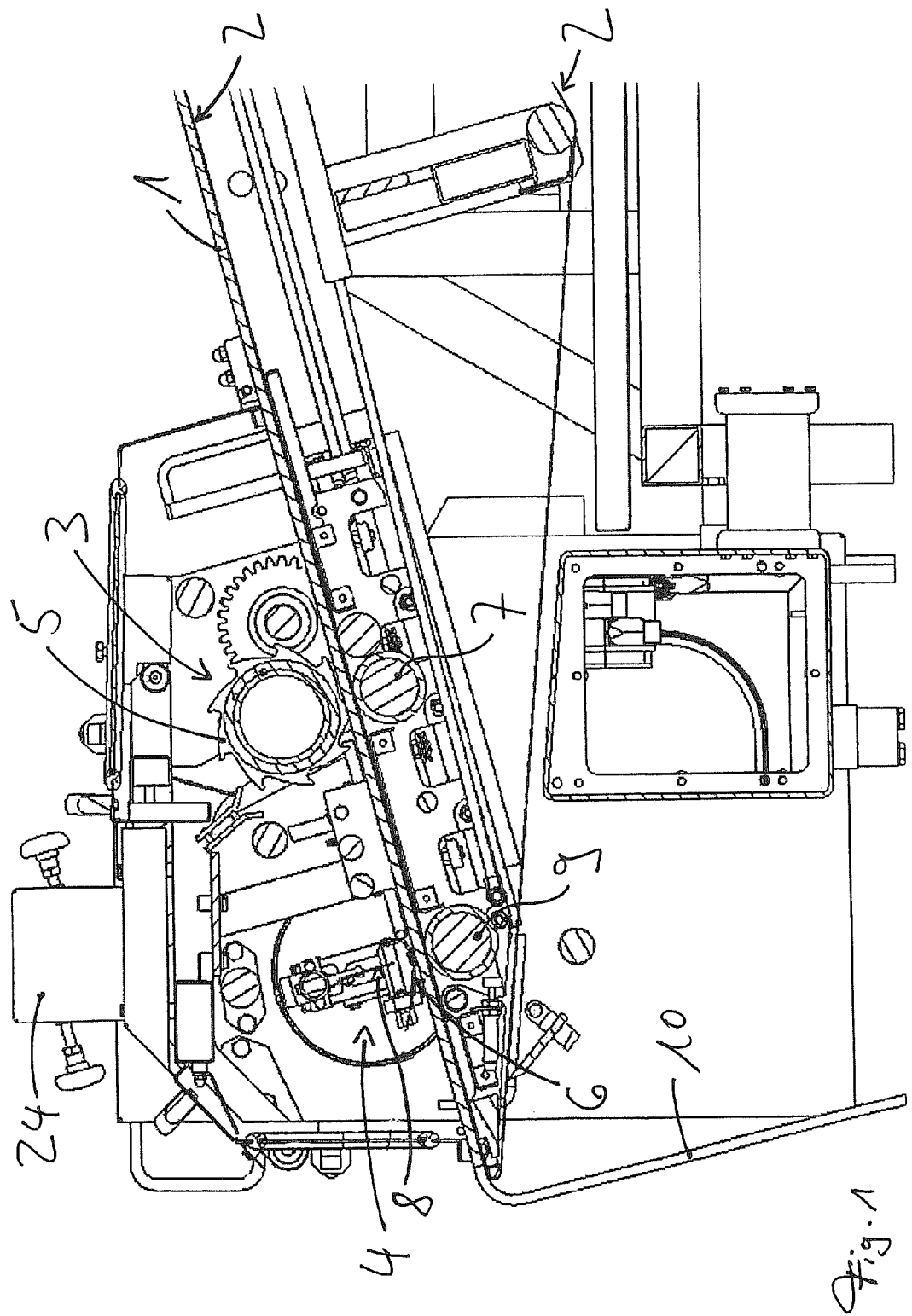
FIG. 1 shows a section through the device according to the invention.

FIG. 1 shows a device according to the invention for the cutting of pieces of predetermined length from a cheese mass which was shaped to a wide cheese bar 1 and fed to the endless conveyor belt 2 running with conveying speed in a preceding method step. The device comprises a longitudinal cutting means 3 and a transverse cutting means 4 arranged downstream thereof in the conveying direction.

The longitudinal cutting means 3 has cutting blades 5 provided with a plurality of teeth in each case, which blades rotate in the conveying direction, yet with an increased rotational speed in relation to the conveying speed. A backpressure roller 7 is provided below the cutting blades 5 under the conveyor belt 2, which forms the counter bearing for the cutting. The complete longitudinal cutting means 3 can be pivoted upwards by means of gas springs, so that it is simple to clean. In the case of upwardly pivoted longitudinal cutting means 3, and with detensioning, the conveyor belt can be removed as a complete unit.

A cut through the transverse cutting knife 8 is to be seen in FIG. 1 from the transverse cutting means 4, which for its part cuts against a backpressure roller 9. To be seen however are the edge strips 10 of the cheese bar 1 which are not cut and in this case are conveyed away and supplied for reuse. To generate a cutting gap between product and transverse cutting knife, the discharge unit is slightly inclined. Also to be seen is the "entrained" hold-down device 6 which can be adjusted manually by means of the adjusting device 24.

Figure 2:
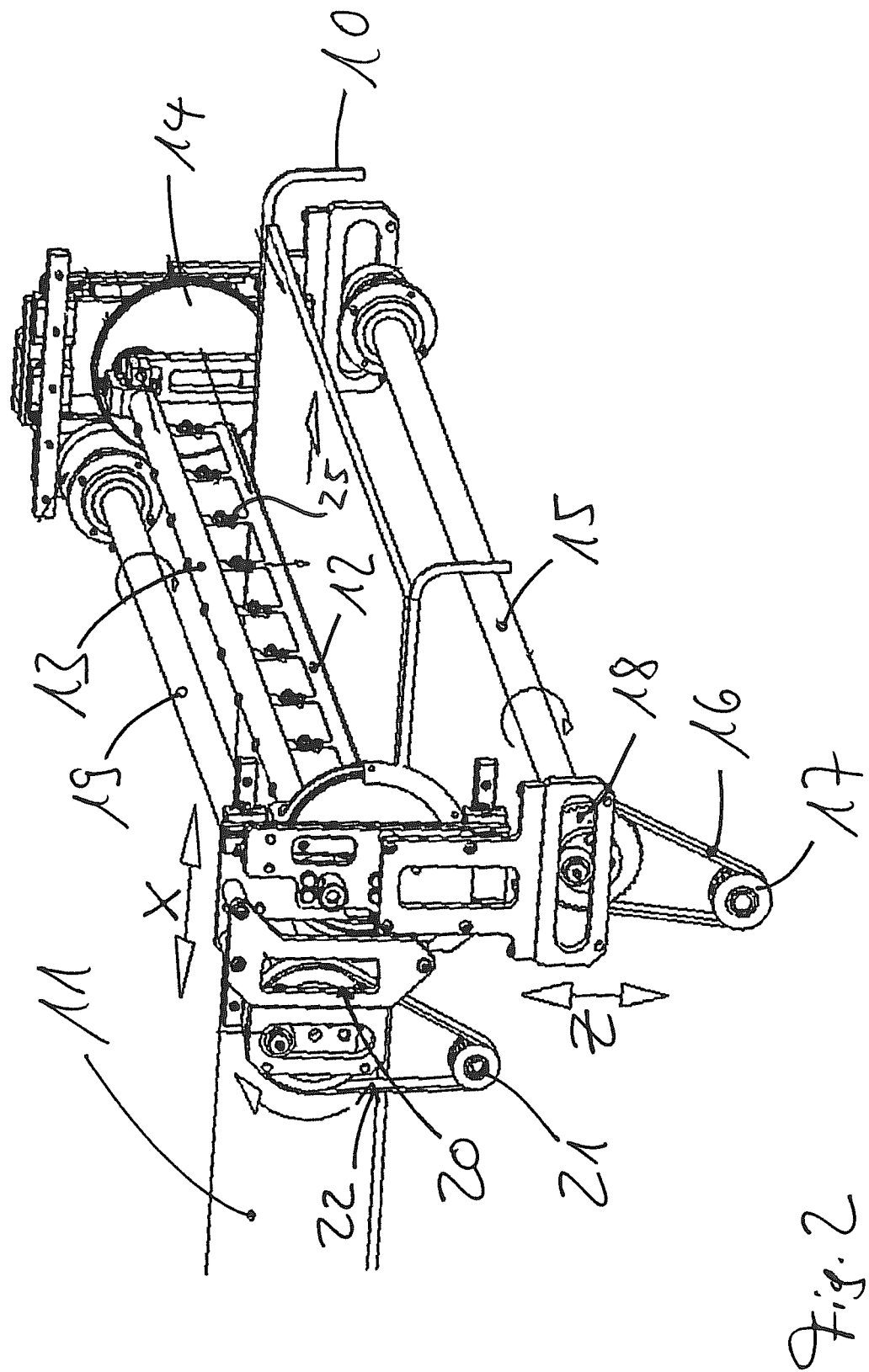
FIG. 2 shows a view of the transverse cutting device

Details of the transverse cutting means are shown in FIG. 2: To be seen is the indicated cheese bar 11, the longitudinal sections of which are not to be seen however. The transverse cutting means has a transverse cutting knife, bridging a part of the cheese bar 11, with a continuous blade 12 which is held on a knife carrier 13. Provided in-between are adjustment screws 25 arranged with a spacing, which enable an adjustment of the flexible transverse cutting knife in the z direction.

The transverse cutting knife is controlled with an eccentric drive which is covered on both sides by a lid 14. The eccentricity can be set in four stages. The eccentric drive brings about a movement of the transverse cutting knife in the cutting direction of the z axis (arrow), the eccentric shaft 15 being controlled by means of a belt 16 of a servomotor 17.

The eccentric shaft 15 is entrained in guides in the conveying direction. For the movement in the conveying direction along the x axis (arrow), a further eccentric shaft 19 is provided, which is guided on both sides in guides 20 and is likewise driven by a servomotor 21 by means of a belt 22.

Thus, the movement of the transverse cutting knife is broken down into one component along the conveying direction ("x axis") and one component vertical thereto in the cutting direction ("z axis"), the drive controlling both movement components independently of one another. With the eccentric drive, a drive is present for the transverse cutting knife, which brings about a movement of the transverse cutting knife at conveying speed during the transverse cutting along the conveying direction. Various movement sequences, speeds and parameters can be programmed by means of the separated servodrives for the x movement and the z cutting movement. In this case, the eccentric stroke can be set for a plurality of stroke lengths in the x and the z axis in each case. The hold-down device 6 (FIG. 1) is mechanically coupled onto the x movement. In the present case, the hold-down device 6 is set a few millimeters, in particular 3-6 mm above the product. To this end, its height can be set manually.

The invention claimed is:

1. Method for the cutting of pieces of predetermined length ("sticks") from a cheese mass, wherein the cheese mass is shaped in a continuous process to a wide cheese bar of predetermined thickness, wherein the cheese bar is fed to a longitudinal cutting apparatus via a conveyor belt with conveying speed, wherein the cheese bar is cut by the longitudinal cutting apparatus initially in longitudinal strips lying parallel next to one another, wherein the longitudinal strips lying parallel next to one another on the conveyor belt are cut into pieces by a transverse cutting device, wherein the transverse cutting device has a transverse cutting knife, bridging part of the cheese bar such that the edges of the cheese bar remain uncut, the transverse cutting knife is entrained with the cheese bar at the conveying speed during the transverse cutting and the cheese pieces created via the longitudinal cutting and the transverse cutting are conveyed away, wherein the uncut edge strips of the cheese bar remaining after creating the cheese pieces are removed from the conveyor belt and conveyed away for separate further processing.

2. Method according to claim 1, wherein the movement of the transverse cutting knife during transverse cutting has one component along the conveying direction ("x axis") and vertical thereto in the cutting direction ("z axis"), wherein movements in each movement component are controlled independently of movements in the other movement component.

3. Method according to claim 1, wherein the cheese pieces created following longitudinal cutting and transverse cutting initially remain on the conveyer belt in an ordered layer.

4. Method according to claim 3, wherein the individual cheese pieces created following longitudinal cutting and transverse cutting are separated from one another via displacement along the conveyer belt in the conveying direction.

5. Method according to claim 2, wherein the length of the cheese pieces is set by controlling the transverse cutting movements of the transverse cutting knife relative to the conveying speed.

6. Method according to claim 1, wherein the longitudinal strips and the cheese pieces created via transverse cutting are acted upon during transverse cutting by a hold-down device arranged on or a few millimeters above the surface of the cut cheese bar and engaging with the cut cheese bar while moving with the cut cheese bar at the conveying speed until the transverse cutting knife has pulled back out of the cheese mass.

7. Method according to claim 1, wherein the longitudinal cutting apparatus comprises cutting blades provided with one tooth, or a plurality of teeth, for the longitudinal cutting, wherein the tooth height is greater than the thickness of the cheese bar, the circumferential speed of the cutting blades is set in such a manner in relation to the conveying speed that the tooth tip of a tooth descends into the cheese bar when cutting and brings about a slit of certain slit length in the cheese bar moving in the same direction as the cheese bar, and the tooth, when the cutting blade has only one tooth, or the next tooth in the direction of rotation of the cutting blades, brings about a slit which adjoins the previous slit.

8. Device for the cutting of pieces of predetermined length from a cheese mass comprising (a) a conveyor belt suitable for conveying a cheese bar at a conveying speed; and (b) a longitudinal cutting apparatus suitable for cutting a cheese bar into parallel strips and (c) a transverse cutting device suitable for cutting parallel cheese strips into pieces wherein the transverse cutting device is located downstream in the conveying direction from the longitudinal cutting apparatus and comprises a transverse cutting knife and a drive, wherein the drive is operatively connected with the transverse cutting knife for moving the transverse cutting knife such that the movement of the transverse cutting knife has one component along the conveying direction ("x axis") and one component vertical thereto in the cutting direction ("z axis") and the transverse cutting knife is capable of bending in a cutting direction vertical to the conveying direction, wherein the transverse cutting device further comprises an adjustment apparatus operatively connected with the transverse cutting knife which is suitable for setting bending of the transverse cutting knife in the cutting direction.

9. Device according to claim 8, wherein the conveyor belt and the cutting apparatus form a mobile structural unit suitable for insertion into a production line.

10. Device according to claim 8, wherein the transverse cutting apparatus further comprises a hold down device operatively associated with the transverse cutting knife for preventing lifting of cheese strips from the conveyor belt when the transverse cutting knife is moved vertically away from the conveyor belt.

11. Device according to claim 8, wherein the drive of the transverse cutting device is a bilateral drive and the transverse cutting device further comprises a bilateral guide, wherein the bilateral drive and the bilateral guide enable independent controlling over each movement components.

\* \* \* \* \*